June 6, 1967  J. MAURICE  3,323,624
CLUTCH DIAPHRAGM SPRING WITH RESILIENT CUSHION
Filed Jan. 14, 1965  7 Sheets-Sheet 4

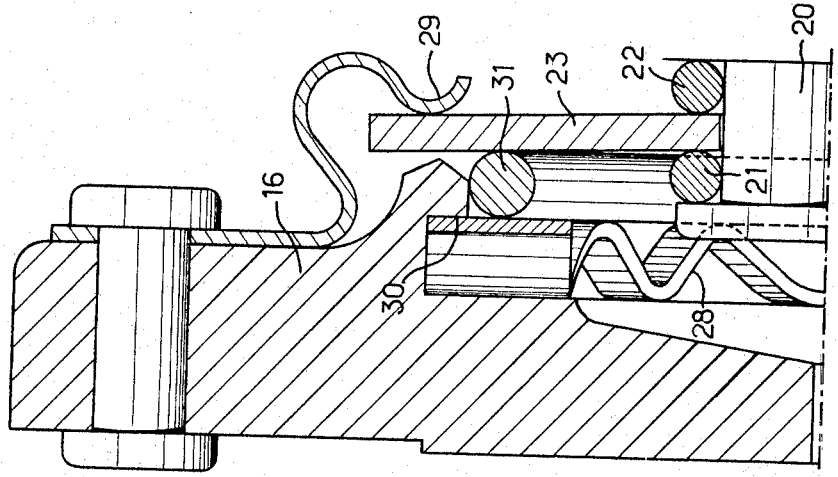
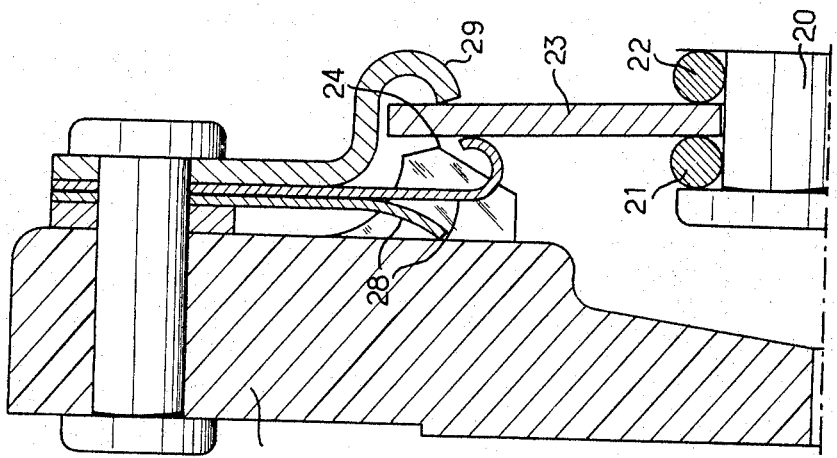
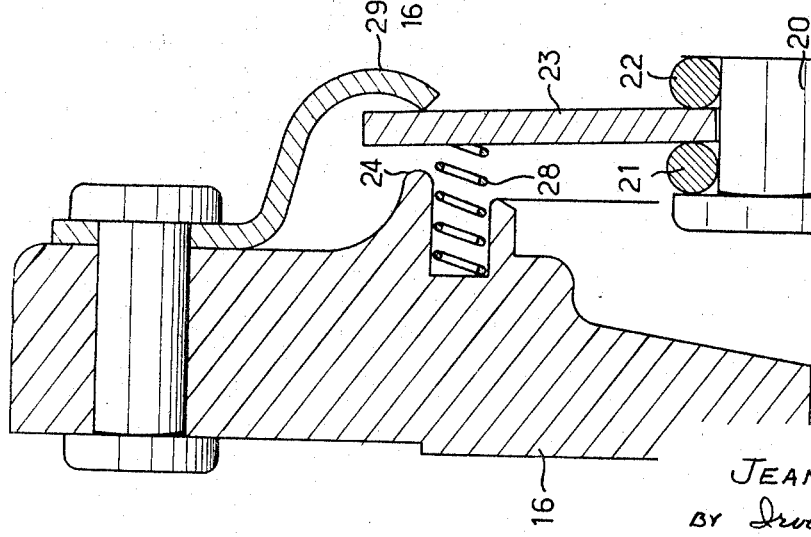
INVENTOR:
JEAN MAURICE
BY Irwin S. Thompson
ATTORNEY

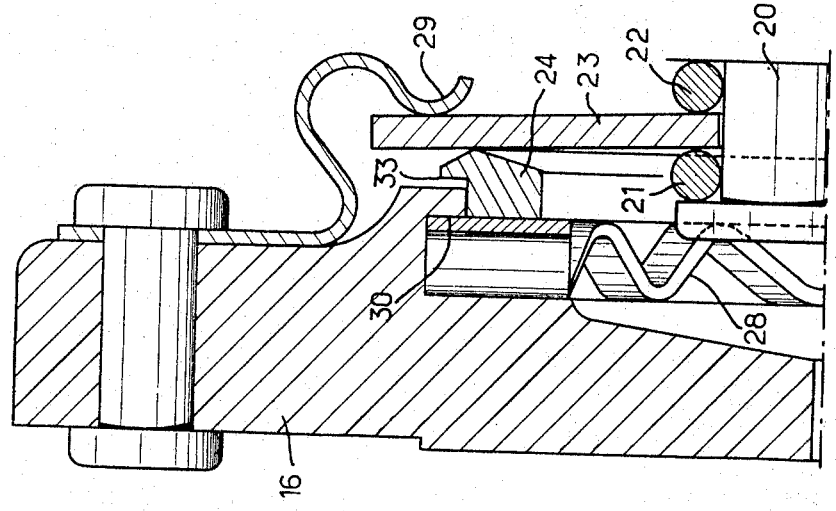
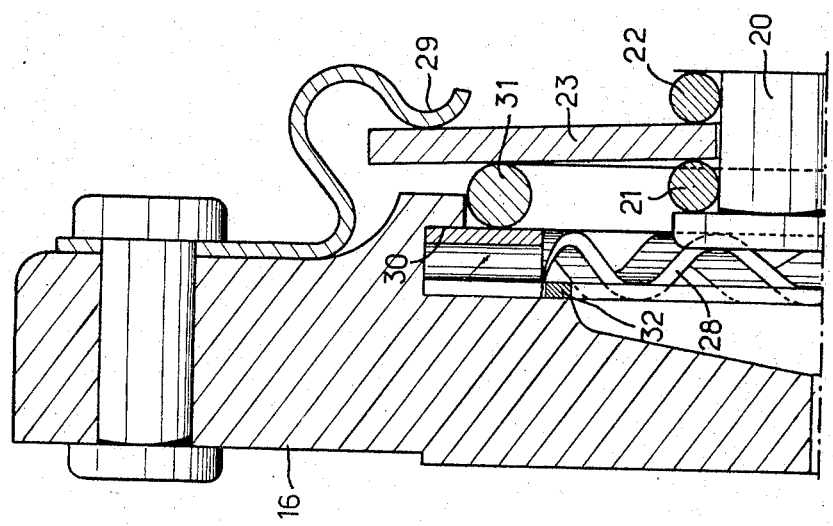
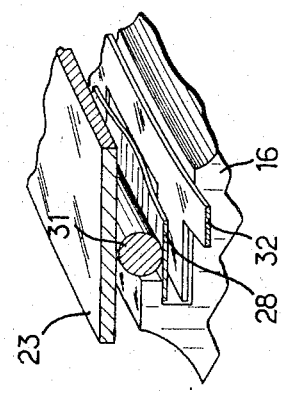

INVENTOR:
JEAN MAURICE
BY Irvin S. Thompson
ATTORNEY

June 6, 1967  J. MAURICE  3,323,624
CLUTCH DIAPHRAGM SPRING WITH RESILIENT CUSHION
Filed Jan. 14, 1965  7 Sheets-Sheet 7

INVENTOR:
JEAN MAURICE
BY Irwin S. Thompson
ATTORNEY

United States Patent Office 3,323,624
Patented June 6, 1967

3,323,624
CLUTCH DIAPHRAGM SPRING WITH RESILIENT CUSHION
Jean Maurice, Paris, France, assignor to Societe Anonyme Francaise du Ferodo, a corporation of France
Filed Jan. 14, 1965, Ser. No. 425,431
Claims priority, application France, Jan. 24, 1964, 961,440; Dec. 8, 1964, 997,812
4 Claims. (Cl. 192—89)

The present invention relates to clutches comprising a friction disc intended to be gripped between two plates rotating in synchronism, one of which is fixed axially while the other is axially movable, a cover being fixed to the first of these plates, the gripping of the disc resulting from the elastic action of clutch means between the cover and the second plate, while de-clutching means are provided to oppose and overcome the elastic action of the engaging means for the purpose of releasing the friction disc from between the two plates, at will.

The invention is more particularly concerned with clutches of this kind in which an elastic diaphragm has a peripheral portion in the shape of a washer which constitutes the engaging means, while its central portion comprises radial slots forming levers which constitute the de-clutching means.

The present invention has for its object improvements in clutches, especially in diaphragm clutches, by virtue of which the conditions of engagement are improved, with a good progression acting at the right time, that is to say between the initial point of engagement at which the disc begins to be driven by the plates and the point of synchronism at which all slip ceases in this drive. The invention is also intended to ensure, especially in the case of a diaphragm clutch, a better application of the forces applied in operating the clutch. Still a further object of the invention is to permit of obtaining these various results with a simple and convenient construction.

The improvements in accordance with the invention are especially characterized in that an elastic progression device is mounted in series with the engaging means between the cover and the second plate, this device having an elastic force less than that of the engaging means, and having a limited pre-determined travel between a position of pre-stress at which its force is a minimum but advantageously not zero, and a position of stress at which its force is a maximum. In the case of a diaphragm clutch, the elastic progressive device is mounted in series with the said peripheral washer, either on one side or the other of the said washer, between the cover and the second plate.

The pre-stress enables all superfluous progressiveness to be eliminated before the point of contact, and a larger control travel to be available for the useful phase which follows: the position chosen for the progression device permits a high precision to be given to its characteristics (stiffness, position and load in the pre-stressed condition, position and load in the condition of maximum stress, etc.), and to adapt the operation of this device suitably to the useful phase comprised between the point of contact and the point of synchronism of the clutch members.

In addition, in the case of a diaphragm clutch, the device according to the invention permits the conditions of application of the efforts applied to operate the clutch to be improved.

The objects, characteristic features and advantages of the invention will further be brought out from the description which follows below of forms of embodiment chosen by way of example with reference to the accompanying drawings, in which:

FIG. 2 is a view to a larger scale of the progression device of this clutch, shown in the de-clutched position;

FIGS. 3, 4 and 5 are respectively views similar to FIG. 2, but relating to various alternative forms;

FIG. 6 shows the device of FIG. 5 in horizontal perspective;

FIG. 7 is also a view similar to FIG. 2, but relates to a further alternative construction;

Figure 1:
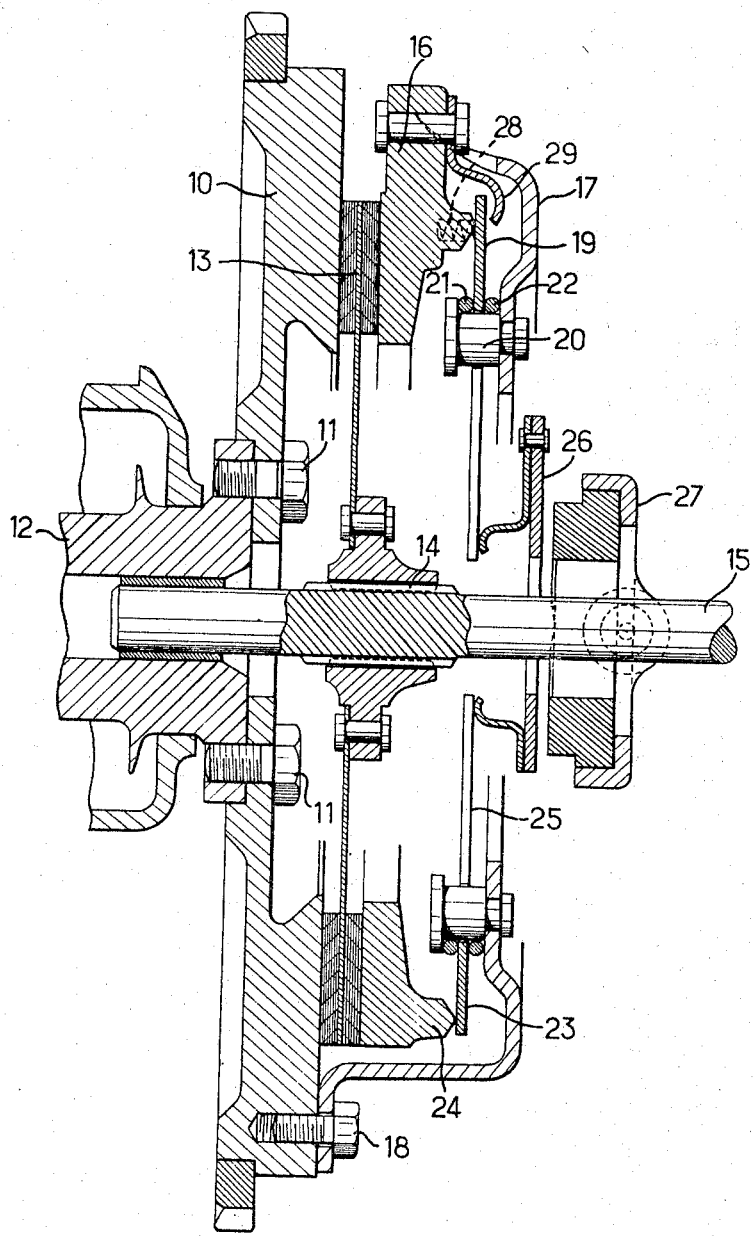
FIG. 1 is a view in longitudinal section of a clutch according to the invention, in the engaged position.

In the form of embodiment shown in FIGS. 1 and 2, which relates by way of example to an application of the invention to a clutch of the diaphragm type, there is seen in FIG. 1, at 10, the fly-wheel of the clutch which forms a first axially-fixed plate screwed at 11 on the driving shaft 12, at 13 the friction disc which is mounted with splines 14 on the driven shaft 15, at 16 a second plate which is axially movable and fixed for rotation with the plate 10 and which, in co-operation with the plate 16, is intended to grip the disc 13, and at 17 a cover screwed at 18 on the plate 10. The disc 13 is of the non-progressive type, that is to say of simple construction, but it could be of the progressive type.

An elastic diaphragm 19 is interposed between the cover 17 and the plate 16 so as to push the plate 16 elastically against the disc 13 which is in turn pressed against the plate 10 for the purpose of engaging the clutch. The diaphragm 19 is mounted so as to rock on small pillars 20 on the cover 17, and is positioned by a pair of keeper-rings 21 and 22. The peripheral portion 23 of the diaphragm 19 is formed as a washer supported on an annular bead 24 of the plate 16, while the central portion of the said diaphragm 19, is provided with radial slots which form de-clutching levers 25. The latter are adjacent to a ring 26 which is attached to the cover 17 and which is intended to be engaged by a de-clutching stop 27.

When the abutment 27 is moved away from the ring 26 (position of FIG. 1) the washer 23 by acting between the ring 22 and the bead 24, maintains the clutch in the engaged position. In order to de-clutch, the abutment 27 is pushed against the ring 26, which causes the levers 25 to rock and releases the action of the washer 23, thus effecting disengagement.

According to the invention (FIGS. 1 and 2), an elastic progression device 28 is mounted in series with the washer 23 between the cover 17 and the plate 16. This device has an elastic force less than that of the washer 23. It has a pre-determined limited travel between a position of pre-stress (FIG. 2) at which its force is a minimum but not zero, and a position of stress (FIG. 1) at which its force is a maximum.

By way of example, the travel of the device 28 between these two positions is of the order of 5 to 10 tenths of a millimetre. The force of the device 28 is of the order of one-quarter in the position of pre-stress and of the order of one-half in the position of stress, of the force of the washer 23.

The elastic progression device consists for example of helicoidal springs 28 (see FIG. 2) housed in the bead 24 and occupying the position of pre-stress when the washer 23 is applied in rearward movement against a rigid abutment 29 fixed to the plate 16, and the position of stress when the washer 23 is moved forward into application against the bead 24.

In the engaged position at which the abutment 27 is spaced apart from the ring 26, the washer 23 by pressing against the bead 24 grips the disc 13 between the plates 10 and 16, while the springs 28 are in the stressed position.

When the abutment 27 is pushed against the ring 26, the washer 23 releases its action for clamping the disc and then passes from the bead 24 on to the abutment 29 and then causes the plate 16 to move back. This backward movement thus permits rapid and complete de-clutching.

For re-engagement, when the action on the abutment 27 is released, the plate 16, by virtue of the springs 28, follows the forward movement carried out by the periphery of the washer 23, and thus approaches the disc 10. There is thus a rubbing contact of the disc 13 between the plates 10 and 16, after which, the movement of the levers 25 continuing, the washer 23 passes from the abutment 29 to the bead 24, which causes a progressive gripping of the disc 13 between the plates 10 and 16, by the action of the elastic device 28, which passes from its condition of pre-stress to its condition of stress. The gripping action is then accentuated by the direct action of the washer 23 on the bead, and is complete when the abutment 27 has moved back from the ring 26.

With the arrangement which has just been described, there are obtained very progressive engagements in the useful phase comprised between the point of contact at which the disc 13 begins to be driven by the plates 10 and 16, and the point of sychronism at which all slip ceases in this drive. In addition, as will now be shown below, this arrangement permits the avoidance or the attenuation of the anomaly which it generally encountered in diaphragm clutches, and which resides in a transient effect of decrease of applied force during the course of de-clutching.

Figure 14:
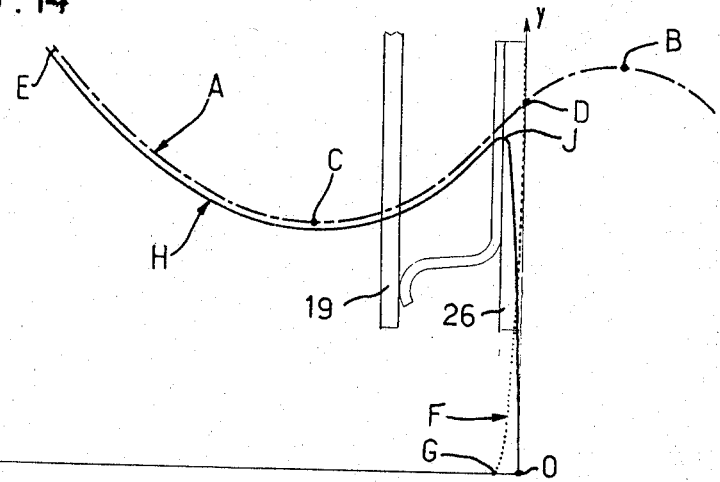
FIG. 14 is a diagram illustrating, in the curve in full lines, the variations of the load on the ring as a function of the travel of the ring, when the clutch is not provided with the progression device according to the invention and when the friction disc is of the non-progressive type.
Figure 15:
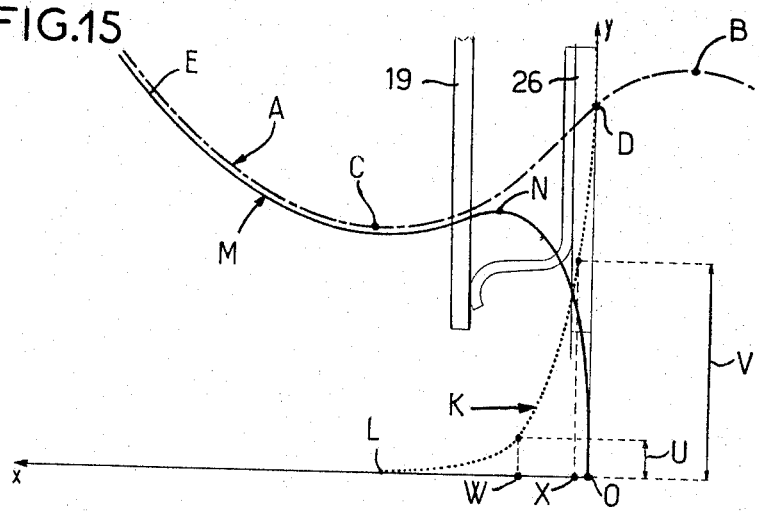
FIG. 15 is a diagram similar to that of FIG. 14, but obtained when the clutch has no progression device according to the invention, and when the friction disc is of the progressive type.
Figure 16:
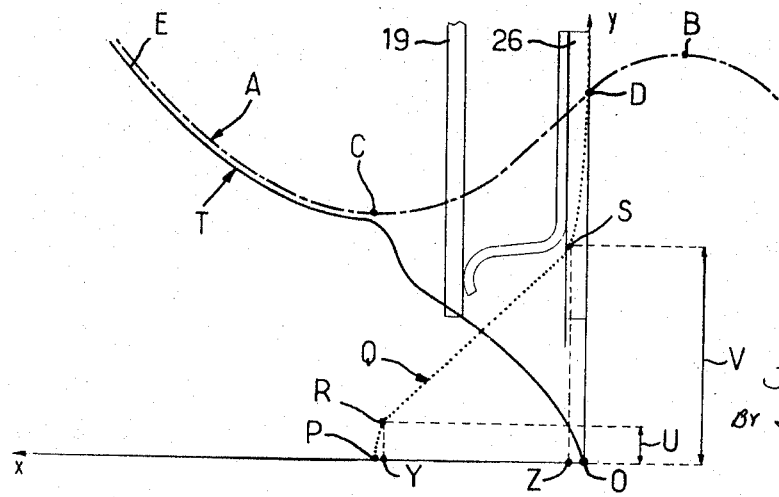
FIG. 16 is a diagram similar to those of FIGS. 14 or 15, but obtained when the clutch has a progressive device according to the invention, the friction disc being either of the rigid or progressive type.

Reference will now be made to FIGS. 14 to 16 which illustrate the performances of the improved clutch in accordance with the invention.

In the diagram shown in FIG. 14, there is plotted in abscissae Ox the travel of the ring 26, the origin O corresponding to the engaged position such as shown in FIG. 1 and indicated diagrammatically in thin lines in FIG. 14, and the force at the ring 26 has been plotted in ordinates Oy.

The curve A in chain-dotted lines represents the characteristic curve proper of the washer 23, that is to say the force as a function of the travel, these two quantities being referred to the ring 26. As will be understood, the part of the curve A which exceeds on the right-hand side of the axis of the ordinates Oy corresponds to the performances which the washer 23 would have if the ring 26 could itself go to the right of the axis of the ordinates Oy, which takes place for example after wear of the friction disc 13.

As can be seen, the curve A does not rise continuously as would be the case with the usual helicoidal springs, for example, but has a sinuous line with a maximum point B which is located to the right of the co-ordinate axis Oy, and with a minimum point C which is located on the left of the ordinate axis Oy. There is indicated at D the point where the curve A cuts the axis Oy of the ordinates.

When the ring 26 passes through the axis Ox of the abscissae, the curve A thus shows in the first place a falling portion DC and then a rising portion CE, which is characteristic of diaphragm clutches and results from the particular elastic properties of a washer such as the washer 23.

When the clutch is not fitted with a device according to the invention such as the device 28, and when the friction disc 13 is of the non-progressive type, this disc has a very slight compression travel under the application of the forces, which is indicated at the level of the ring 26 by a behaviour illustrated by the curve F in dotted lines in FIG. 14. This curve F is almost coincident with the axis Oy of the ordinates. It starts from a point G very close to the origin O on the axis Ox of the abscissae and terminates substantially at the point D on the axis Oy of the ordinates.

The real curve H of the forces at the ring 26 which, for each abscissa, has an ordinate equal to the difference of the ordinates of the curves A and F, and which is represented in full lines in FIG. 14, thus has a portion OJ rising very rapidly to a maximum value J corresponding to an abscissa slightly smaller than the abscissa G, and then coincides with the curve A having a falling portion JC and a rising portion CE.

When the clutch is not provided with a device according to the invention, such as the device 28, and when the friction disc 13 is of the progressive type, this disc has an appreciable but reduced compression travel under the application of the forces, which is indicated at the level of the ring 26 by a behaviour illustrated by the curve K in dotted lines on FIG. 15. This curve K has a parabolic form and starts from a point L located on the abscissae axis Ox, terminating substantially at the point D on the ordinates axis Oy.

The real curve M of the forces at the ring 26 which, for each abscissa, has an ordinate equal to the difference of the ordinates of the curves A and K, and which is shown in heavy full line in FIG. 15, thus has a portion ON rising up to a maximum N corresponding to an abscissa a little smaller than the abscissa L, and then coincides with the curve A, having a falling portion NC and a rising portion CE.

When the clutch is provided with the device 28, the travel of this device 28 between the two abutments 24 and 29 is indicated, at the level of the ring 26, by the travel OP (see FIG. 16) which is selected in such manner that the point P is located substantially at the level of or beyond the abscissa of the minimum value C.

The curve Q in dotted lines, illustrating at the level of the ring 26 the behavior of the device 28 has a first portion PR which is almost vertical and which corresponds to the taking-up of the pre-stress of the device 28, a mean inclined portion RS which corresponds to the active work of the device 28 during its travel between the abutments 24 and 29, and an almost vertical portion SD which cuts the co-ordinates axis Oy substantially at the point D.

The device according to the invention can be chosen in such manner that the ordinate U of the point R corresponds substantially to the load of the contact point at which the disc 13 begins to be driven by the plates 10 and 16, and so that the ordinate V of the point S corresponds to the load at the point of synchronism at which all slip ceases in this drive.

When comparing FIGS. 15 and 16, assuming for the needs of this comparison that the abscissae of the points L and P are equal, it is found that the travels OL and OP of the progression devices, even while equal to each other, have in the case of FIG. 15 a very small useful portion WX and in the case of FIG. 16, that is to say in the case of the inventon, the useful portion YZ is very large. This gain is due, on the one hand to the pre-stress PR which has the effect of lifting the curve Q and which does not exist in the case of the curve K, and on the other hand, to the fact that the portion RS of the curve Q is substantially linear, whereas the curve K is concave facing upwards. These two properties preferably adopted in combination, could be utilized separately while remaining within the scope of the invention.

It will furthermore be noted that the device according to the invention, by its position and its method of construction, is of great accuracy, which is indicated by the curve Q which is itself very precise.

The real curve T of the forces at the ring 26 which, for each abscissa, has an ordinate equal to the difference of the ordinates of the curves A and Q, and which is shown in heavy full line in FIG. 16, has a rising portion OC and then coincides with the curve A along the also rising portion CE. In other words, the curve T is continuously rising, when the disc 13 is new, which furthermore improves the performance after the disc 13 has become worn.

By virtue of the invention, this enables the conditions of application of the forces to be improved during operation when the clutch is of the diaphragm type.

In the alternative form shown in FIG. 3, the arrangement is similar to that which has been described with reference to FIGS. 1 and 2, but the elastic progression device 28 according to the invention comprises cambered radial blades. The operation is similar to that which has been previously described.

Reference will now be made to FIG. 4, in which the device 28 consists of a corrugated ring. In this case, the position of pre-stress is defined by the application of the ring 28 against an edge 30 of the plate 16. It will be noted that a keeper-ring 31 is interposed between the washer 23 and the corrugated ring 28.

This is also the case in the example of FIGS. 5 and 6, but in this case furthermore, the position of stress is defined by means of a small annular castellated plate 32 preventing the ring 28 from being compressed beyond the useful deflection. The arrangement of FIG. 6 could be adopted within the scope of the invention, even when the washer 32 is eliminated.

It will be noted that in the examples of FIGS. 4, 5 and 6, the position and the load of the pre-stress are defined by the machined edge 30, that is to say in a very accurate manner.

In the alternative form shown in FIG. 7, the bead 24 is movably mounted with respect to the plate 16 and is interposed in abutment between the corrugated ring 28 and the washer 23. The position of pre-stress is defined by the application of the ring 28 against the edge 30, while the position of stress is defined by the application of an edge 33 of the bead 24 against the plate 16.

Figure 8:
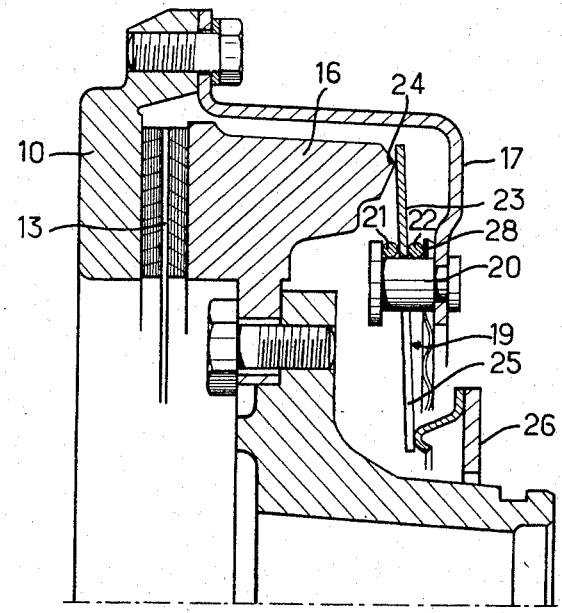
FIG. 8 is a half-view in longitudinal section of another clutch according to the invention.
Figure 9:
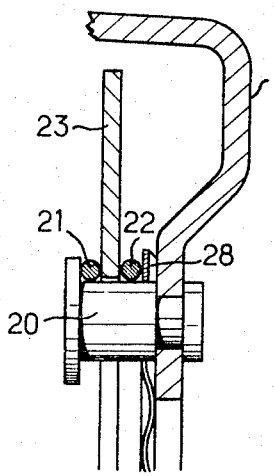
FIG. 9 is a view to a larger scale of the progression device of the clutch of FIG. 8.

Reference will now be made to FIGS. 8 and 9, in which the arrangement is again similar to those which have been previously described, but in which the plate 16 is axially fixed while the assembly of the plate 10 and the cover 17 is axially movable.

The elastic progression device is in this case constituted by a corrugated ring 28 interposed between the keeper-ring 22 and the cover 17. The position of pre-stress is defined by the axial distance imposed by the small pillar 20 in order to contain the various elements 21, 23, 22, 28. The position of stress is in this case obtained by total compression of the ring 28.

Figure 10:
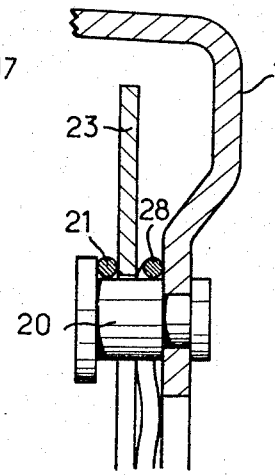
FIGS. 10 and 11 are views similar to FIG. 9, but concern respectively two further alternative constructions.

In the alternative form shown in FIG. 10, the keeper-ring 22 is eliminated and it is a corrugated ring, constituting the elastic progression device 28 which is substituted for it.

Figure 11:
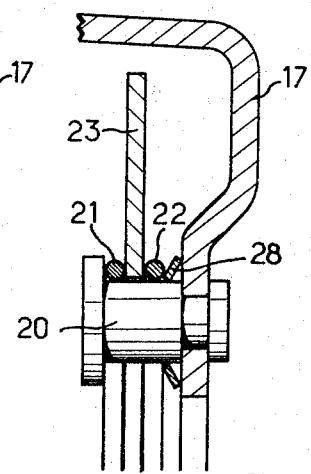

In the alternative form of FIG. 11, the progression device comprises small conical washers 28 threaded over the small pillars 20 and interposed between the keeper-ring 22 and the cover 17.

Figure 12:
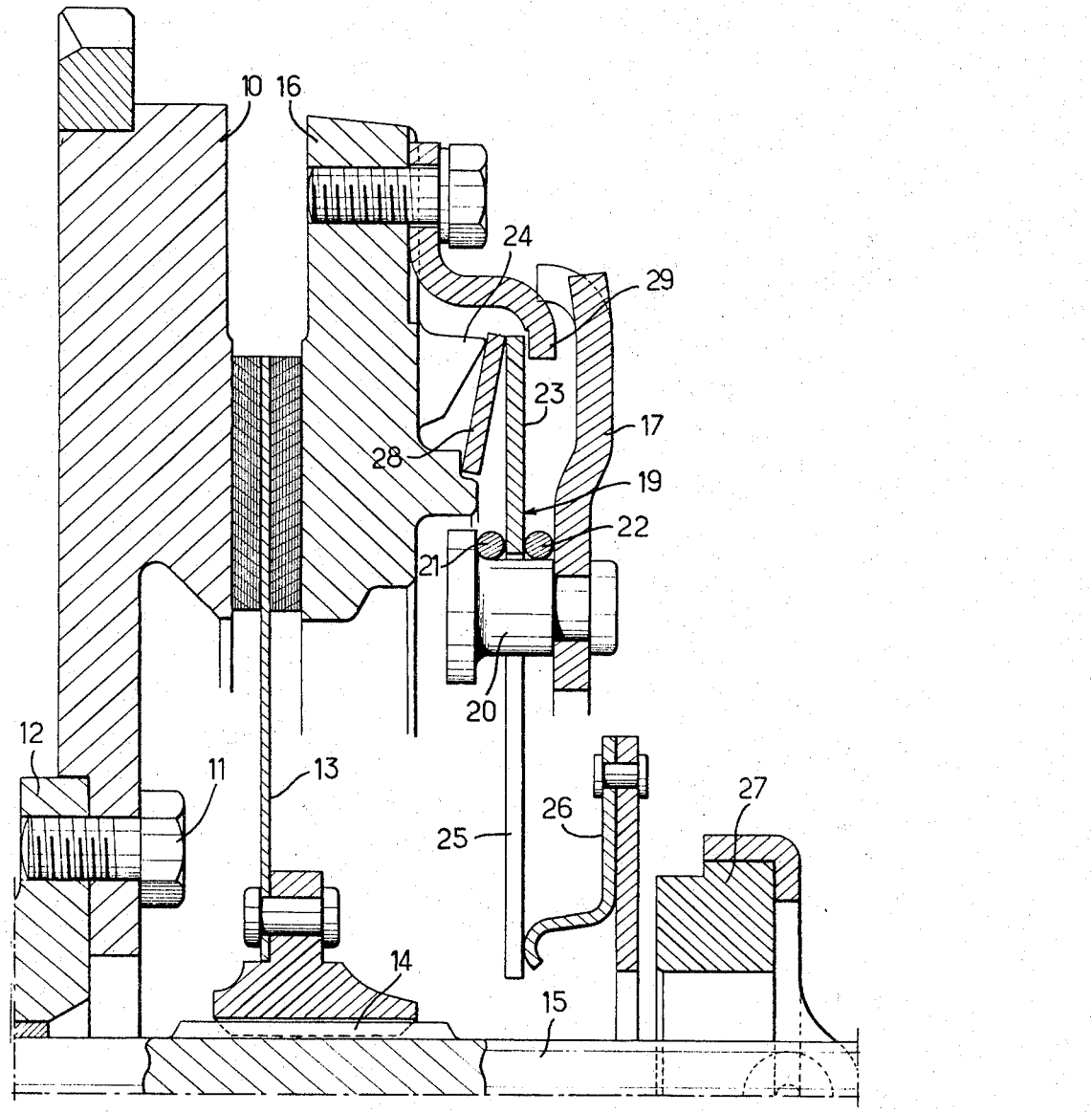
FIG. 12 is a partial view in longitudinal section of another alternative form of diaphragm clutch, the clutch being in the engaged position.
Figure 13:
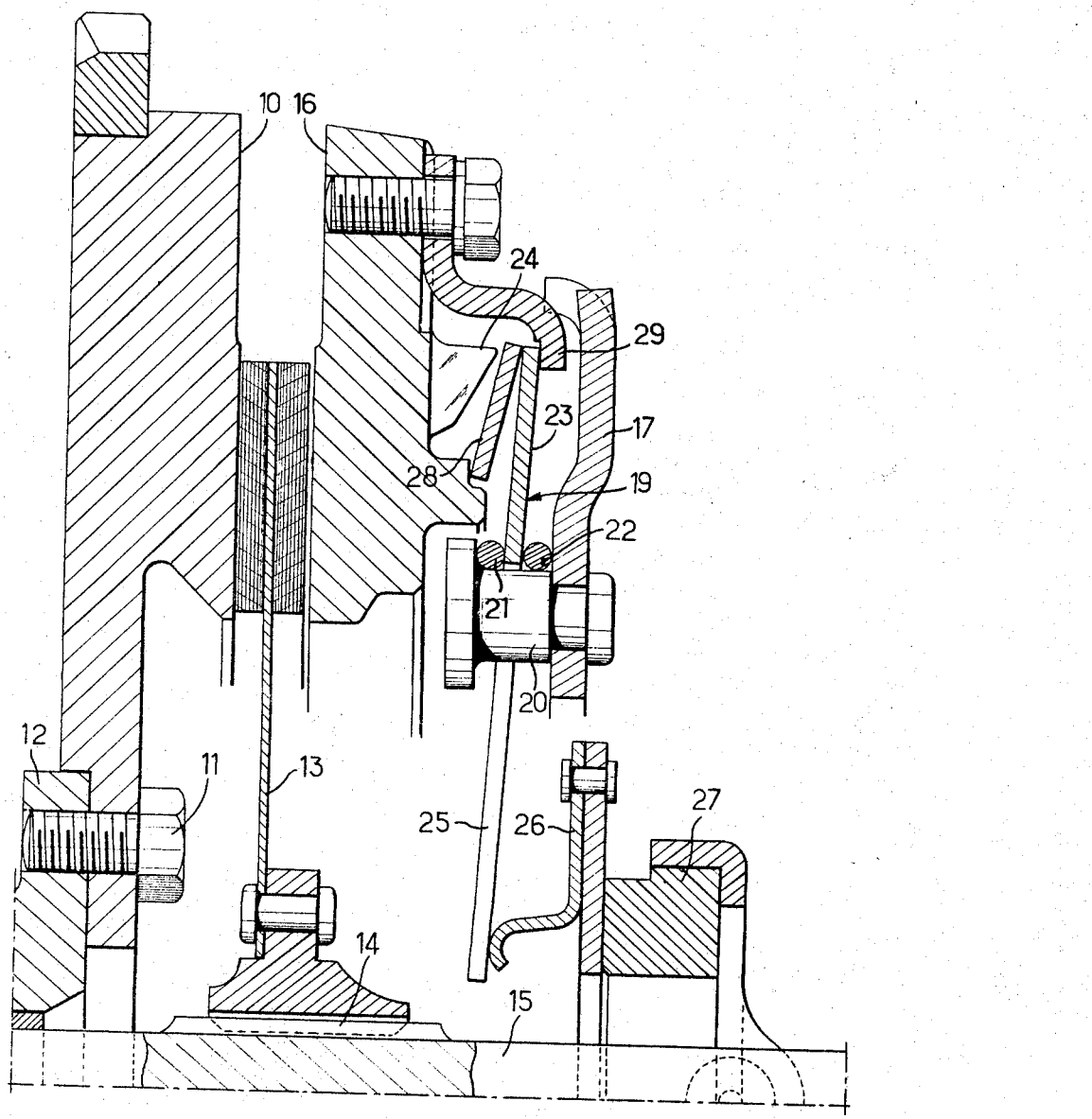
FIG. 13 is a view similar to FIG. 12, but in which the clutch is in the disengaged position.

In the alternative form shown in FIGS. 12 and 13, the elastic progression device 28 consists of an auxiliary elastic washer which is mounted in series with the washer 23, between the cover 17 and the plate 16. The washer 28 is mounted in such manner that during its operation it has an elastic force less than that of the washer 23. The two washers 23 and 28 have the same external diameter and are supported one against the other at their peripheries. The washer 28 is supported on the plate 16 by its inner contour and is intended to be supported against the bead 24 by its outer contour. The internal diameter of the washer 28 is greater than the internal diameter of the washer 23.

The washer 28 has a pre-determined travel limited between a position of pre-stress (case of FIG. 13) in which the washer 28 is moved away from the bead 24, while the washer 23 is applied in backward movement against a rigid abutment 29 fixed to the plate 16, and in which the force of the washer is a minimum but is not zero, and a position of stress (case of FIG. 12) in which the washer 28 is applied against the bead 24 while the washer 23 is moved away from the abutment 29, and in which the force of the washer 28 is a maximum.

By way of example, the travel of the washers 23 and 28, constantly applied against each other at their peripheries between the bead 24 and the abutment 29, is of the order of 5 to 10 tenths of a millimetre. The force of the washer 28 applied against the plate is of the order of one-quarter in the position of pre-stress and of the order of one-half in the position of stress, of its load value when the washer is completely flattened. The washer 28 works in a zone in which its characteristic is substantially linear. The loads on the two washers 23 and 28, when the washers are completely flattened, are substantially close to each other.

In the engaged position at which the abutment 27 is spaced apart from the ring 26, the washer 23 is supported through the intermediary of the washer 28 on the bead 24 and grips the disc 13 between the plates 10 and 16. The washer 28 is in the stressed position (case of FIG. 12).

When the abutment 27 is pushed onto the ring 26, the washer 23 releases its action in gripping the disc 13 and comes into application on the abutment 29 so as to effect from that point the backward movement of the plate 16, effecting the de-clutching. The washer 28 is allowed to move away from the bead 24 and occupies the position of pre-stress (see FIG. 13).

For re-engagement, when the action on the abutment 27 is released, the plate 16, by virtue of the washer 28, follows the forward movement carried out by the periphery of the washer 23 and thus approaches the plate 10. There is a rubbing contact of the disc 13 between the plates 10 and 16. Then, as the movement of the levers 25 continues, the washer 23 moves away from the abutment 29 and approaches the washer 28 of the bead 24, thus causing a progressive gripping of the disc 13 between the plates 10 and 16 under the action of the washer 28, which passes from its condition of pre-stress (FIG. 13) to its position of stress (FIG. 12). Once the washer 28 has come into application against the bead 24, the gripping effect is then accentuated by the action of the washer 23 on the assembly 28–24 and is complete when the abutment 27 is moved away from the ring 26.

It will of course be understood that the invention is not limited to the forms of construction described and shown, but includes all alternative forms in the construction of its various parts and in its applications. In particular, the constructions of FIGS. 9, 10 and 11 are applicable to a clutch of the type shown in FIG. 1, while the constructions of FIGS. 2 to 7 are applicable to a clutch of the type of FIG. 8. In addition, the invention is applicable not only to clutches with a single diaphragm, but also to clutches having two or more diaphragms, to double clutches with diaphragms, and to clutches associated with diaphragms, etc.

What I claim is:

1. A clutch comprising two plates rotatable in synchronism, one of the plates being axially fixed and the other of the plates being axially movable, a friction disc adapted to be gripped between the two plates, a cover rigidly fixed to one of said plates, an elastic diaphragm having a central portion provided with radial slots forming levers, the elastic diaphragm having a peripheral portion in the form of a washer, the levers of the elastic diaphragm being pivoted at their radially outer ends to said cover and movable axially to apply or release the elastic action of the washer to grip or release the friction disc between the two plates at will; characterized by a progressive elastic device disposed at the lever pivots and acting in compression between said cover and said peripheral washer of said diaphragm, said progressive elastic device having an elastic force substantially less than that of said peripheral washer.

2. A clutch as claimed in claim 1, and positioning rings on opposite sides of said washer, said progressive elastic device comprising a corrugated ring disposed between a said postioning ring and said cover.

3. A clutch as claimed in claim 1, in which said progressive elastic device comprises a corrugated positioning ring for said washer.

4. A clutch as claimed in claim 1, and positioning rings disposed on opposite sides of said washer, said progressive elastic device comprising a plurality of small conical washers disposed between a said positioning ring and said cover.

References Cited

UNITED STATES PATENTS

| 1,915,732 | 6/1933 | Goldschmidt | 192—89 |
| 3,235,049 | 2/1966 | Hufstader | 192—89 |
| 3,236,349 | 2/1966 | Wiggens et al. | 192—89 X |

FOREIGN PATENTS 943,039  11/1963  Great Britain.

BENJAMIN W. WYCHE III, *Primary Examiner.*